United States Patent
Mesing

[11] 3,780,862
[45] Dec. 25, 1973

[54] VORTEX OIL-WATER SEPARATOR SYSTEM PROVIDING CLEAN WATER

[75] Inventor: Arthur E. Mesing, East Hartford, Conn.

[73] Assignee: United Aircraft Corporation, East Hartford, Conn.

[22] Filed: Mar. 1, 1972

[21] Appl. No.: 230,665

[52] U.S. Cl.................... 210/84, 210/195, 210/512
[51] Int. Cl............................................ B01d 21/26
[58] Field of Search...................... 210/84, 304, 512; 209/144, 211; 55/426, 427, 459

[56] References Cited
UNITED STATES PATENTS

| | | | |
|---|---|---|---|
| 3,481,118 | 12/1969 | Willis et al...................... | 210/512 X |
| 3,517,814 | 6/1970 | Minegishi........................ | 210/512 X |
| 3,052,361 | 9/1962 | Whatley et al.................. | 210/512 X |
| 3,507,397 | 4/1970 | Robinson............................ | 210/512 |

FOREIGN PATENTS OR APPLICATIONS

| | | | |
|---|---|---|---|
| 996,826 | 12/1951 | France................................ | 210/521 |

Primary Examiner—Samih N. Zaharna
Assistant Examiner—F. F. Calvetti
Attorney—Donald F. Bradley

[57] ABSTRACT

A vortex separator is used to separate a mixture of materials of different densities, such as an oil-water mixture, into two components. The mixture is injected tangentially into one end of a cylindrical chamber at a high flow rate to impart a swirl to the flow in the chamber. Clean or recirculated water is injected into the chamber from the opposite end wall. The separated water is exhausted from the chamber through a port in the center of the end wall containing the water injectors, and the separated oil is exhausted through a small duct located at the center of the water exhaust port. Two or more separators may be connected in series for applications in which a ship's ballast or bilge water is separated into a first component containing primarily oil which can be stored in a small volume, and a second component of substantially pure water which may be dumped overboard. A baffle plate may be added in the chamber to improve the separation process.

7 Claims, 5 Drawing Figures

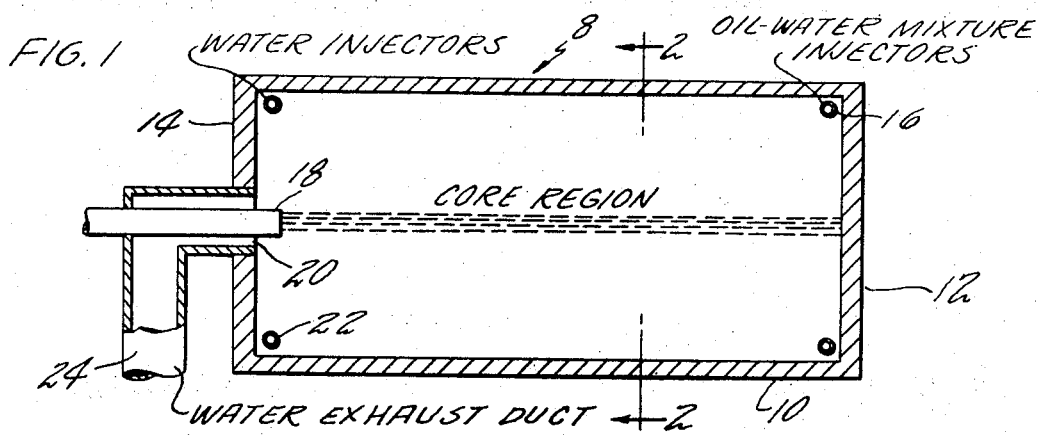
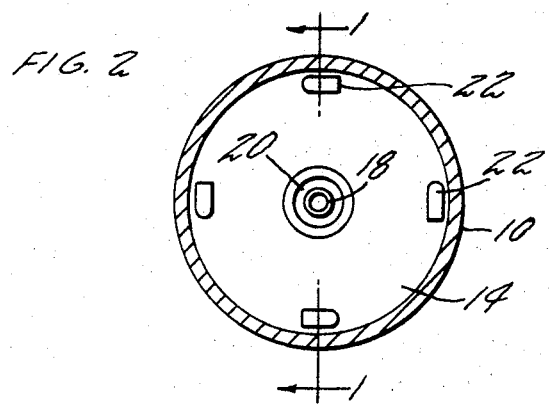
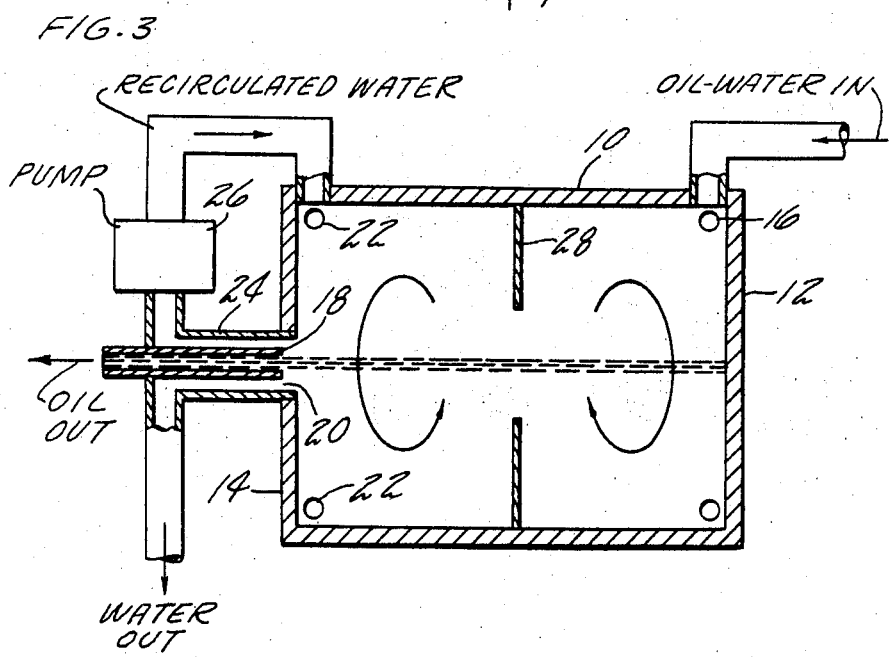

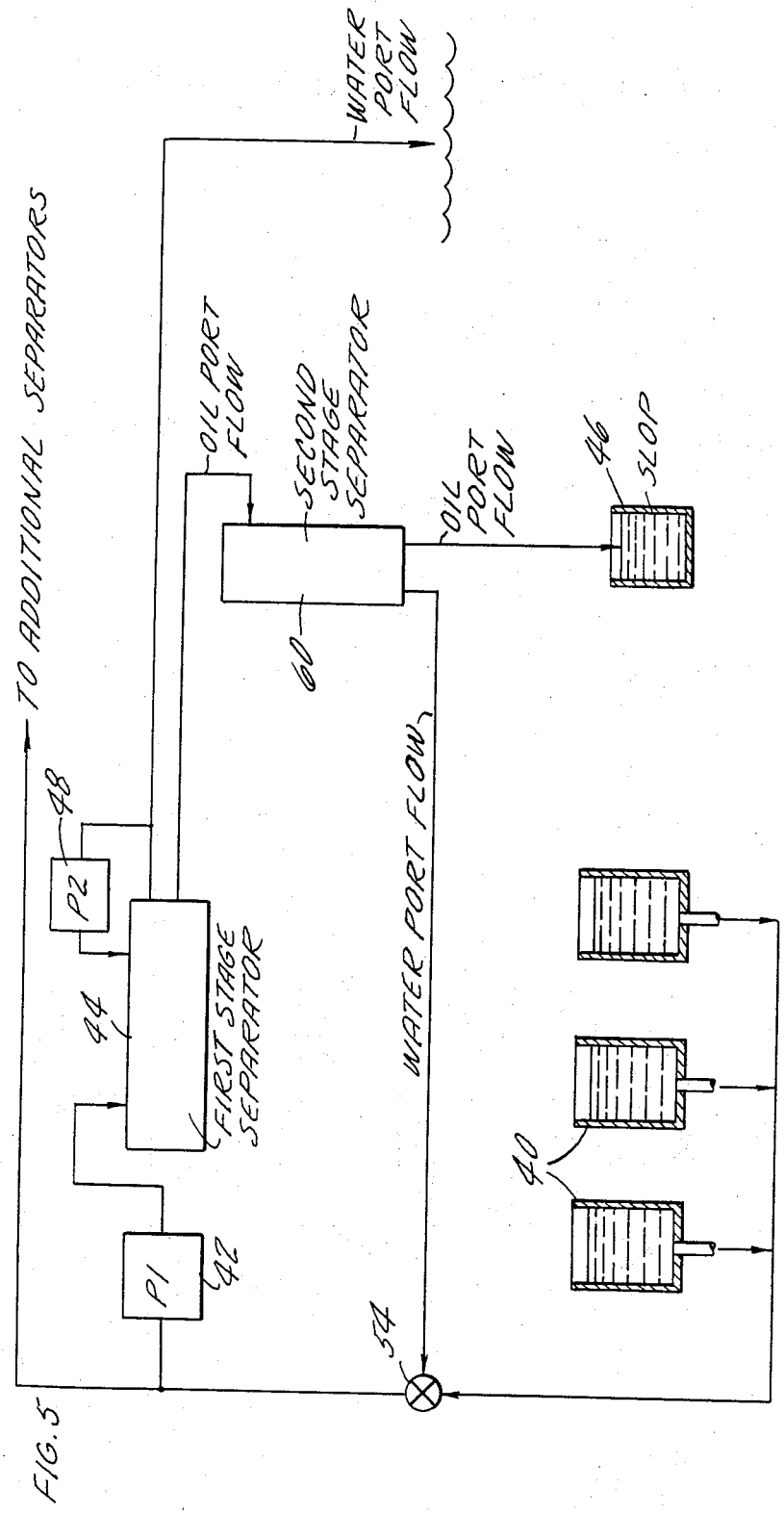

VORTEX OIL-WATER SEPARATOR SYSTEM PROVIDING CLEAN WATER

CROSS-REFERENCES TO RELATED APPLICATIONS

This application contains subject matter related to the following two applications assigned to the same assignee:

1. Application Ser. No. 230,663, filed Mar. 1, 1972 for "Vortex Oil-Water Separator System Providing Clean Water" in the name of David P. Miller and 2. Application Ser. No. 230,664, now abandoned, filed Mar. 1, 1972 for "Vortex Oil-Water Separator System Providing Clean Water" in the names of Arthur E. Mensing, Richard C. Stoeffler and Jerome F. Jaminet.

BACKGROUND OF THE INVENTION

1. Field of the Invention

This invention relates to a vortex separator for separating a mixture of two or more materials of different densities into two separate components. In particular, this invention provides an improved separator for immiscible liquids such as oil and water, and results in a component containing primarily oil and a component of substantially pure water. A specific application of the invention is for separating ship's ballast or bilge water into an oil component which may be stored in a limited volume, and a water component which may be dumped overboard without contaminating the ocean water. The separator may be used for other applications such as separating the liquid waste from restaurants or other business establishments into components, for example grease and water, for ease of disposal.

2. Description of the Prior Art

Vortex separators for separating a mixture of materials, either solid, liquid or gaseous, into two components, are well known in the art. U.S. Pat. No. 3,566,610 uses a cylindrical chamber into which a mixture such as an automobile exhaust is injected tangentially and a vortex generated to separate the mixture into two separate effluent streams of different densities. Copending U.S. patent application Ser. No. 125,232, now abandoned entitled "Vortex Flow System for Separating Oil From an Oil-Water Mixture", and copending application Ser. No. 125,154, now U.S. Pat. No. 3,743,102, entitled "A Vortex Separator Using Core Plates", both applications being filed Mar. 17, 1971 and assigned to the same assignee as this application, disclose and claim a vortex separator in which a fluid mixture such as oil and water is injected tangentially into a cylindrical chamber adjacent one end thereof and a vortex generated so that the oil forms a core region along the axis of the chamber. The oil is removed from the chamber through a port located in the chamber end wall at the end of the chamber at which the mixture is injected, while the water is removed from a port in the center of the opposite end wall. A core plate may be provided coaxially with the water exhaust port to assist in the formation of the core of oil and prevent the oil from being removed with the water. In another configuration, a duct is provided in the center of the core plate through which oil is removed from the chamber. A portion of the exhausted water may be recirculated through the chamber to assure that only relatively clean water is removed from the vortex separator.

In the above-identified copending applications, the main object is to assure that the oil removed from the vortex separator is relatively pure so that the oil may be stored in a limited volume. The intended use of the vortex separators disclosed in the copending applications is to assist in the cleaning of oil spills on a body of water, to remove the oil from the water and to store it in a storage container until it may be properly disposed of. If the water exhausted from the separator contains a substantial percentage of oil, it may be recirculated back through the separator, or dumped back into the body of water where it may be recollected and passed again through the separator. If, however, a substantial amount of water were to be mixed with the oil removed from the separator, a much larger storage volume for the oil would be required. The need for a large storage volume could severely inhibit the clean-up operation.

The present invention operates on the same general principles as the vortex separator disclosed in the prior art copending applications, but contains modifications to the structure and operation of the vortex separator in order to assure that the exhausted water is relatively oil-free. One of the primary applications of the present invention is to clean the ballast or bilge tanks of ships to provide relatively pure water which can then be dumped overboard without contaminating the ocean or inland waters. If some water remains in the oil removed from the separator, it is of little consequence since the amount of oil to be stored is relatively small.

SUMMARY OF THE INVENTION

In accordance with the present invention, there is provided an improved oil-water separator wherein an oil-water mixture is injected tangentially into a circumferential chamber and a vortex is generated within the chamber forcing the lighter oil to form a core along the axis of the chamber. The oil is removed from the chamber through a duct in the center of the end wall of the chamber opposite the end at which the oil-water mixture is injected. The water which surrounds the oil core is removed from the chamber through a port in the same end wall in which the oil duct is located, the water removal port being concentric with and of larger radius than the oil removal duct.

In accordance with another aspect of the present invention, clean or recirculated water is injected in a tangential direction into the circumferential chamber adjacent the end wall from which the oil and water are removed from the chamber. The addition of clean or recirculated water assists in maintaining the vortex in the chamber, and results in improved operation.

In accordance with a further aspect of the present invention, an annular baffle plate having a circular aperture in the center thereof may be inserted in the vortex chamber parallel to the end walls and located between the end walls. Its function is to reduce the number of small oil particles which reach the end wall and may be exhausted with the water.

In accordance with another aspect of the present invention, two or more vortex separators may be connected in series if the water exhausted from the first vortex separator contains an undesirably high oil content so that the remaining oil may be fully removed before the water is dumped back into the ocean. If minimum oil storage volume is desired, the vortex separator of the type disclosed in the previously referenced copending applications may be connected in series with a vortex separator as disclosed herein, the first vortex separator of the series producing relatively clean water which may be dumped into the ocean, and the second vortex separator being fed the oil output from the first separator to produce substantially pure oil. The water output from the second separator may then be recirculated back into the first separator to remove any oil contained in the water from the second vortex separator.

BRIEF DESCRIPTION OF THE DRAWINGS

FIG. 1 is a section of a preferred vortex separator of this invention.

FIG. 2 is a section of the vortex separator shown at 2—2 of FIG. 1.

FIG. 3 is a schematic of the vortex oil-water separator configuration showing recirculation of a portion of the water exhausted from the separator, and the addition of a baffle plate.

FIG. 5 is a schematic diagram of an additional system for cleaning ballast water.

DESCRIPTION OF THE PREFERRED EMBODIMENT

Figure 4:
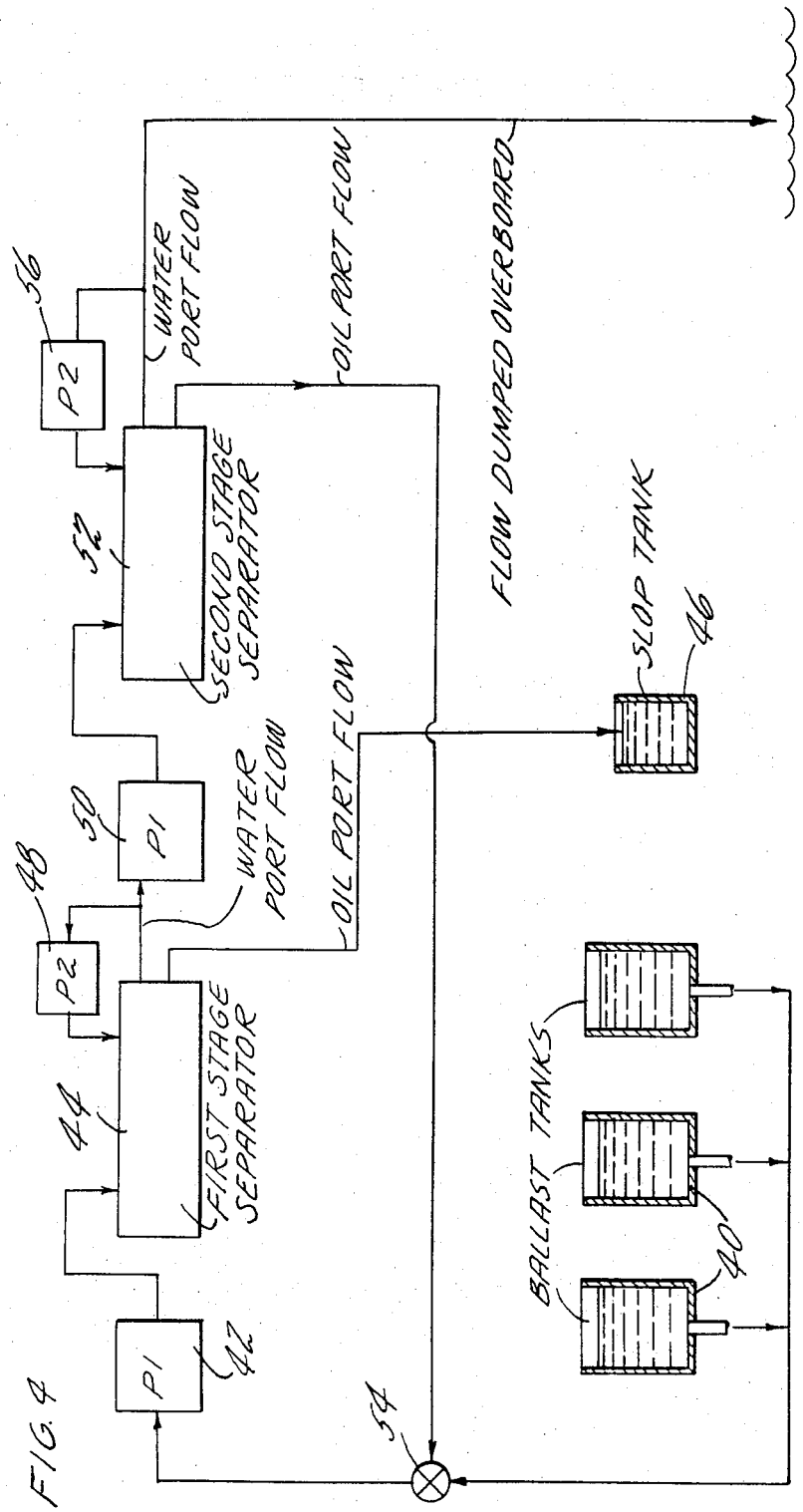
FIG. 4 is a schematic diagram of a system in which two staged separators are used for cleaning ballast water.

Oil pollution on shipping lanes and in harbors is a recurring and increasing problem. A major contributor to this pollution is the oil contained in large volumes of ballast water that are discharged from tankers. Detection of these low levels of oil and enforcement of current laws that regulate such discharges are difficult. The development of on-shore facilities to process ballast water as a possible solution to the problem would be very costly and of no help when tankers take on or discharge ballast at sea to compensate for sea conditions. Moreover, eliminating oil discharge by providing tankers with tanks that carry only ballast water is uneconomical because it reduces the oil-carrying capacity of the tanker.

The present invention discloses an on-board oil-water separation system which provides a solution to the oil discharge problem. The system and the novel vortex separator have a high separation effectiveness reducing oil content to below 20 parts per million. Further advantages of the present system are the high flow-rate processing capacity, minimum space requirements, minimum maintenance requirements, and low capital and operation costs.

The heart of the present separation system is a vortex separator shown in FIGS. 1 and 2. The vortex separator 8 consists of a cylindrical lateral wall section 10 which may be constructed from metal, fiber glass, plastic or any other rigid material. The cylindrical wall section 10 is connected to end walls 12 and 14 generally formed from the same material as cylindrical wall 10. A plurality of injectors 16 are located adjacent end wall 12 through which the oil-water mixture is injected generally at a pressure above atmospheric into the separator in a tangential direction. The injectors 16 are located near to the peripheral wall 10 of the separator. The injectors may pass through either the circumferential wall 10 or the end wall 12. Four injectors are shown, but this number may be varied depending on the size of the separator, the capacity of the pump, etc. The oil-water mixture enters the separator 8 at a very high flow rate so as to impart a strong swirl to the flow. As the mixture swirls axially, the difference in centrifugal forces due to the density differences between the water and the oil accelerates the less dense oil radially inward to form a core region consisting almost entirely of oil.

The use of a confined vortex flow is very desirable for separating the oil from the water. The vortex flow has the unique property of providing large relative radial acceleration between two components of differing specific gravities. In the present application, the oil is concentrated at the center of the vortex where it can be conveniently removed through a small duct 18 located at the center of the end wall 14. All the water is exhausted through a port 20 located at the center of the end wall 14, the duct 18 being concentric with the center of the water exhaust port 20. The oil exhaust duct 18 may be flush with the end wall 14, may be retracted into the water exhaust duct 24 as shown in FIG. 3, but preferably extends into the vortex chamber a distance of 1 or 2 percent of the length of the chamber. The end of the oil exhaust duct 18 may be slightly flared to provide a larger opening for the oil.

Positioned within the vortex chamber adjacent the end wall 14 are a plurality of injectors 22. Four injectors are shown, but any other number may be used. Clean water is injected into the chamber in a tangential direction through the nozzles 22 in order to sustain the strength of the vortex along the entire length of the separator, and to prevent the unseparated oil from entering the boundary layer on end wall 14 and subsequently being exhausted with the water through the water exhaust port 20.

An alternative embodiment is shown in FIG. 3 in which recirculated water is fed into the injectors 22 rather than clean water. In FIG. 3, the water outlet port 20 is connected to a duct 24, a portion of the water being recirculated back into the separator through injectors 22 by means of a pump 26, while the remainder of the water is removed from the separator, and may be dumped overboard depending on the application.

Tests were conducted on a vortex separator having an approximately three to one length-to-diameter ratio. Equal flow rates of both the oil-water mixture injected through ducts 16 and clean water injected through ducts 22 were used. The injection velocities were equal. Injected oil-water mixtures ranging from about 50 parts per million to about 7,500 parts per million were tested, and the water exhausted through port 20 generally contained between five and fifteen parts per million of oil. Reducing the percentage of clean water injected into the chamber through ducts 22 relative to the percentage of oil-water mixture injected into the chamber through injectors 16 resulted in the exhaust water containing a higher oil concentration than did the previous tests employing equal percentages of clean water and the oil-water mixture.

Recirculation of the exhaust water into the injectors 22 as shown in FIG. 3 would increase the oil concentration in the exhaust water by some factor less than two. Generally, recirculation of a part of the water exhaust will not cause the exhaust water to exceed 20 parts per million of oil.

The modified vortex oil-water separator shown in FIG. 3 contains a baffle 28 which is located halfway between the end walls 12 and 14. Other locations may be preferred for other embodiments. The baffle acts as a barrier between the oil-water mixture injected into the chamber through injectors 16, and the clean or recirculated water which is injected into the chamber through injectors 22. The oil-water mixture flows through an annulus concentric with the axis of the separator in the baffle 28. In some applications the performance of the oil-water separator is improved with the baffle installed, particularly when the oil-water mixture contains small oil particles which result from shearing of the oil-water mixture as the mixture is pumped or being injected. The use of the baffle prevents the mixing at large radii, where centrifugal forces are smallest, of the oil-water mixture and the clean or recirculated water.

The vortex separator embodiment shown in FIG. 3 operates in a manner nearly identical to that of the separator shown in FIGS. 1 and 2. The oil-water mixture is injected tangentially at the end wall 12 through injectors 16. As the flow swirls toward baffle 28 and moves radially inward, centrifugal separation occurs. The flow approximates a free vortex where the tangential velocity is inversely proportional to the radius, except near the center where, due to viscous effects, it approaches solid body rotation in which the tangential velocity is directly proportional to the radius. Thus, from the peripheral wall 10 to the viscous core, the radial acceleration field varies inversely with radius cubed; inside the viscous region, it varies directly with radius. In this acceleration field, the oil droplets experience a radially inward force which increases with decreasing radius until the viscous core is reached; the droplets are, therefore, differentially accelerated with respect to the water. Other key factors in determining this differential acceleration are the specific gravity difference between the oil and water, the tangential velocity of the flow at the peripheral wall 10 which is related to the jet injection velocity and the ratio of injection area to vortex chamber cross-sectional area, and the hydrodynamic drag on the droplets which is related to their velocity and diameter.

Tests conducted on the embodiment of FIG. 1 show that the separation ratio, the ratio of inlet mixture oil concentration, $C_M$, to cleansed water oil concentration, $C_W$, increases with increasing inlet mixture oil concentration. Separation ratios up to 780 have been obtained.

The teachings of the copending applications Ser. Nos. 125,154 and 125,232 with regard to average residence time of the oil-water mixture in the separator, injection areas and secondary flow parameters are generally valid for the present embodiments.

FIG. 4 shows schematically a two-stage system which may form the basis of a shipboard oil-water separation system for cleaning ballast water or bilge water. At present there exists no known ballast water cleaning system having a high volume flow rate that will reduce the oil concentration in the ballast water below 20 parts per million. Most current systems use filtration techniques that have low processing rates, high maintenance costs, and which may be adversely affected by normal pitch and roll of the ship. The systems are inadequate because impending regulations will have very strict requirements upon discharging oil water into the sea.

Referring specifically to FIG. 4, oily water is pumped from the ship's ballast tanks 40 through a pump 42 which is expected to be an existing pump on the ship and injected into the first stage separator 44. Vortex separator 44 is preferably one of the separators shown in FIGS. 1-3 of the present application, and preferably has a separation ratio of at least 100. The oil port flow from separator 44 is placed in a "slop" tank 46 on board the ship. A portion of the water port flow is recirculated into separator 44 by means of pump 48, and reinjected into the separator 44 to maintain the strength of the vortex in separator 44 along the length thereof and to prevent the unseparated oil from entering the boundary layer on the end wall of the vortex separator. The recirculated flow may range between 25 percent to 100 percent of the inlet flow for separator 44 depending on the system performance required. The remainder of the first stage water port flow is pumped by means of pump 50 and injected into the second stage separator 52. Separator 52 may be identical to separator 44 except that the oil port flow from separator 52 will contain approximately the same oil concentration as the ballast water. Rather than diverting this flow to the slop tank 46, it is combined with the ballast water fed into pump 42 by means of a mixing valve 54. This recirculation of the oily water will reduce by approximately one-half the slop tank storage requirements. As in the first stage separator, a portion of the water port flow of the second stage separator 52 is reinjected into the separator 52 by means of pump 56. If the oil concentration in the remaining water port flow is sufficiently low, it is then piped overboard; otherwise, additional separator stages may be added until the desired purity is attained.

In many applications the water that is initially pumped from the ballast tanks is relatively clean. If during this portion of the processing cycle the oil concentration in the water port flow of the first stage is sufficiently clean to dump directly overboard, then succeeding separator stages can be used in parallel to simultaneously process the relatively oil-free water and thereby increase the processing rate. When the oil concentration increases to a level where one stage processing is inadequate, the separators can be returned to operate in series.

FIG. 5 shows a variation of the ballast water cleaning system of FIG. 4. In the embodiment of FIG. 5, both relatively clean water and substantially pure oil result from the use of two different types of separators. The oily water from ballast tanks 40 is fed, as in FIG. 4, through a mixing valve 54 to a pump 42 and into a first stage separator 44. A portion of the water port flow from separator 44 is recirculated through pump 48. The remainder of the water port flow, if it is sufficiently clean, is dumped overboard. If it is not sufficiently clean, an additional separator stage may be required. The separator 44 is similar to that described in FIGS. 1-3 of the present application.

The oil port flow from separator 44, which generally will contain a substantial amount of water, is fed to the input of a separator 60 which is similar to that described in copending applications Ser. Nos. 125,154 and 125,232. The separator 60 is of the type which produces substantially pure oil at its outlet but a water port outflow which may contain some oil. The oil port flow from separator 60 may be fed to slop tank 46 and, since relatively pure oil is obtained, the volume of tank 46 may be reduced from the requirements of that needed in FIG. 4. The water port flow from separator 60, which contains some oil, is recirculated into the first stage separator 44 by means of mixing valve 54.

Separator 60 may use a core plate as described in the referenced copending applications, and the oil may be exhausted from one or both ends of the separator while the water is exhausted from the end wall of the separator opposite that from which the input oil-water mixture is injected. No water recirculation is required with a separator 60 of the type disclosed in the copending applications.

In some applications it may be necessary to use axial-flow type pumps for the embodiment of FIGS. 4 and 5 rather than the centrifugal pumps normally carried by ships. This is because of the small oil droplet size, and the emulsification in the effluent from centrifugal pumps, which is largely determined by the shear and turbulence in the flow. However, both emulsified portions of the oil-water mixture, as well as the unemulsified oil, can be removed from the pump effluent by the separators disclosed herein. Emulsions cannot be broken, but as long as their specific gravity is less than 1.0, they can be captured in the core of oil produced in the separator.

It may also be desirable to use a radial diffuser to recover some of the energy associated with swirl in the water exhaust from the separators disclosed herein. It is desirable to have as much pressure recovery as possible in order to reduce the pressure head required from the pumps. A diffuser without flow separation and without excessively thick boundary layers is preferred.

It may also be desirable to incorporate into the separator systems a sensor control which monitors the oil concentration in the water exhaust from the final stage of the ballast water cleaning system. The sensor control adjusts the inlet oil-water mixture flow rate, or may shut the system down if the oil concentration in the exhaust exceeds a preset amount. Such sensors and flow rate controls are disclosed in the referenced copending applications.

The disclosed ballast water separation system may be installed at any convenient place on a ship. Its preferred location will depend to a large extent on whether or not the shipboard cargo and ballast pumps can be used. The water exhaust from the separator is preferably discharged near the ship's water line, therefore, the separator should be as low in the ship as possible to avoid unnecessary pump head rise.

While the present invention has been described in its preferred embodiments, it will be apparent to those skilled in the art that changes and modifications may be made to the construction and arrangement of parts without departing from the scope of the invention as hereinafter claimed.

I claim:

1. A method for separating a mixture of oil and water into a component consisting primarily of oil and a component consisting of substantially oil-free water comprising the steps of injecting said mixture tangentially into a cylindrical chamber adjacent one end wall thereof to cause said mixture to swirl axially within said chamber and produce a vortex, the oil being accelerated inwardly forming a core region consisting primarily of oil along the longitudinal axis of said chamber, said core region being surrounded by substantially oil-free water, removing the oil consisting of said core region from said chamber through a duct located in the center of the end wall of said chamber opposite the end of the chamber into which said mixture is injected, removing the substantially oil-free water surrounding said core region from said chamber through a port located in the same end wall as said duct, said port being concentric with surrounding said duct, and injecting an additional volume of said substantially oil-free water into said chamber in a tangential direction through an injector located adjacent the end wall in which said port is located in order to sustain the strength of the vortex along the longitudinal length of said chamber and to prevent unseparated oil contained in said mixture from flowing along the end wall containing said port and subsequently being removed with the water through said port.

2. The method of claim 1 wherein said step of injecting an additional volume of substantially oil-free water includes the step of recirculating at least a portion of the water which is removed from said chamber through said port.

3. Apparatus for separating a mixture of oil and water into its separate components comprising a chamber having a cylindrical lateral wall section and first and second end walls, first injecting means located adjacent said first end wall for injecting said mixture into said chamber in a tangential direction to cause said mixture to swirl axially within said chamber and generate a vortex therein whereby a core consisting predominantly of oil is produced extending axially along the center of said chamber, the oil core being surrounded by water having a low oil content, a duct for extracting the oil from said core located at the center of said second end wall, a port for extracting the water surrounding said core located in the same end wall as said duct, said port being concentric with and surrounding said duct, and second injecting means located adjacent the said second end wall for injecting into said chamber in a tangential direction an additional volume of substantially oil-free water from said port, said additional water sustaining the strength of the vortex in said chamber and preventing unseparated oil contained in said mixture from flowing along said second end wall and subsequently being removed with said water through said port.

4. Apparatus as in claim 3 in which said duct projects a short distance into said chamber.

5. Apparatus as in claim 3 in which said first injecting means comprises a plurality of injectors spaced about the circumference of said chamber for injecting said mixture into said chamber in a tangential direction.

6. Apparatus as in claim 3 in which said second injecting means comprises a plurality of injectors spaced about the circumference of said chamber for injecting said additional volume of higher density material into said chamber.

7. Apparatus as in claim 3 and including a second duct connected with said port for recirculating at least a portion of the water passing through said port to said second injecting means.

* * * * *